United States Patent
Kubota

(10) Patent No.: US 7,203,308 B2
(45) Date of Patent: Apr. 10, 2007

(54) ECHO CANCELLER ENSURING FURTHER REDUCTION IN RESIDUAL ECHO

(75) Inventor: Syuji Kubota, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 352 days.

(21) Appl. No.: 10/483,797

(22) PCT Filed: Nov. 19, 2002

(86) PCT No.: PCT/JP02/12068

§ 371 (c)(1),
(2), (4) Date: Jan. 13, 2004

(87) PCT Pub. No.: WO03/044978

PCT Pub. Date: May 30, 2003

(65) Prior Publication Data

US 2004/0170271 A1 Sep. 2, 2004

(30) Foreign Application Priority Data

Nov. 20, 2001 (JP) ............................. 2001-355299

(51) Int. Cl.
*H04M 1/00* (2006.01)
(52) U.S. Cl. ...................... 379/406.05; 379/406.01; 379/406.06; 379/406.08
(58) Field of Classification Search ............ 379/406.01, 379/406.05, 406.06, 406.08; 381/71.1
See application file for complete search history.

(56) References Cited

U.S. PATENT DOCUMENTS

| 5,668,794 | A | * | 9/1997 | McCaslin et al. ........ 379/406.07 |
| 6,195,430 | B1 | | 2/2001 | Eriksson et al. |
| 6,282,286 | B1 | * | 8/2001 | Reesor et al. .......... 379/406.05 |
| 6,466,666 | B1 | | 10/2002 | Eriksson |
| 6,961,423 | B2 | * | 11/2005 | Pessoa et al. .......... 379/406.08 |

FOREIGN PATENT DOCUMENTS

| GB | 2245459 A | 1/1992 |
| JP | 04150127 | 5/1992 |
| JP | 06038253 | 2/1994 |
| JP | 08223088 | 8/1996 |
| JP | 09162787 | 6/1997 |
| JP | 09275367 | 10/1997 |
| JP | 10285083 | 10/1998 |
| JP | 2001516986 | 10/2001 |
| WO | WO 97/23055 | 6/1997 |
| WO | WO 99/13596 | 3/1999 |

OTHER PUBLICATIONS

Dec. 16, 2005 official Communication and Supplementary European Search Report in connection with European Appl. No. EP 02 80 3530.

* cited by examiner

*Primary Examiner*—Jefferey Harold
(74) *Attorney, Agent, or Firm*—Cooper & Dunham LLP

(57) ABSTRACT

An echo canceller includes: an echo cancellation part canceling echo included in a near-end input signal; a noise suppression part employing a low-pass filter having a variable cut-off frequency adaptive to power of an input signal, the noise suppression part removing a residual echo component from an output of the echo canceller part; a threshold generation part generating a variable threshold varying in accordance with a power level of a far-end input signal; a determination part making a determination based on a comparison between a power level of the output of the echo cancellation part and the variable threshold; and a processing part performing noise suppression using the low-pass filter on the output of the echo cancellation part when the determination part determines that the power level of the output of the echo cancellation part is lower than or equal to the variable threshold.

13 Claims, 4 Drawing Sheets

ECHO CANCELLER ENSURING FURTHER REDUCTION IN RESIDUAL ECHO

TECHNICAL FIELD

The present invention relates to echo canceller technology for howling prevention and echo control, which technology is required in hands-free telephones.

BACKGROUND ART

The function means of an echo canceller is formed mainly of a transversal filter and a coefficient modifier part that successively updates the coefficient of the filter. Generally, the normalized least mean squares (NLMS) algorithm, which is excellent in stability and convergence, relatively simple in terms of operations, and actually realized as a device using an LSI, may be employed as a method of estimating, or updating, the filter coefficient {hi} of the transversal filter.

Further, in order to realize full duplex hands-free communication, the echo canceller requires, as its important functions, an echo canceller protection function and a nonlinear processing (center clipper) function. The echo canceller protection function prevents errors from being caused by the speech of a near-end talker in updating the tap coefficient (filter coefficient) at the time of two-way simultaneous communication (double talk). The nonlinear processing function unconditionally suppresses a low echo signal to a zero value in order to increase the echo suppression effect when the echo level is low.

It is difficult to cancel echoes completely in a conventional common echo canceller that updates the filter coefficient (tap coefficient) of the transversal filter using the NLMS algorithm. This is because the conventional echo canceller treats a speech signal as its main target while assuming an uncorrelated signal, and cannot always secure a sufficient tap length of the transversal filter with respect to the reverberation time of a room. Accordingly, the above-described nonlinear processing is often employed.

The nonlinear processing aims to reduce residual echo by adding a so-called voice switch that turns ON or OFF depending on a signal level. Japanese Laid-Open Patent Application No. 4-150127 discloses such a technique.

Further, Japanese Laid-Open Patent Application No. 10-285083 discloses a device that includes means for varying a clip level and changing transmitting attenuation depending on the condition of transmission.

These voice switching methods can reduce the residual echo, but have difficulty in dealing with the condition of double talk, so that there occurs the problem characteristic of the voice switch that the leading part of the speech of a near-end talker is cut off. In order to solve the above-described problem and ensure further reduction in the residual echo, a technology disclosed in Japanese Laid-Open Patent Application No. 9-162787 has been proposed.

Japanese Laid-Open Patent Application No. 9-162787 discloses a configuration that employs a low-pass filter setting a low cut-off frequency when signal power is low and setting a high cut-off frequency when signal power is high. The residual echo of an echo-canceled signal includes a high-frequency component. Offensive noise can be reduced by suppressing the high-frequency component. The low-pass filter is employed as means for suppressing the high-frequency noise component.

Further, noise suppression means includes power calculation means for calculating the power level of an input signal supplied from an echo cancellation part, comparison means for comparing the power level of the signal calculated by the power calculation means with a predetermined threshold for noise determination, and noise suppression means for performing noise suppression on the signal by the low-pass filter when the comparison result shows that the power level of the signal is lower than or equal to the predetermined threshold.

The low-pass filter of the noise suppression means varies the cut-off frequency so that the cut-off frequency is low when the signal power is low as residual echo and the cut-off frequency is high when the signal power is high as the speech signal of a near-end talker. Specifically, the low-pass filter of the noise suppression means is realized by moving average processing, and the variation in the cut-off frequency of the low-pass filter is realized by a variation in the moving average interval length of the moving average processing. Thereby, the low-pass filter (LPF) with a variable cut-off frequency of a simple configuration can be realized.

The power calculation means obtains the power of the signal expressed in the form of the exponent of $2^n$ by digital processing. The comparison means obtains the number of moving average interval length bits m by subtracting the power level in the form of the exponent of $2^n$ from the noise determination threshold in the form of the exponent of $2^n$. The noise suppression means performs, by digital processing, moving average processing with respect to an interval length determined by the obtained number of moving average interval length bits m when m is not negative.

This technology, however, contains the following problems. That is, the noise suppression means compares the output power of the echo cancellation part with the predetermined determination threshold. The determination threshold can be determined with no problem when the amount of residual echo or a near-end input power value can be estimated in advance. In the case of a great environmental variation, however, it is difficult to distinguish between the residual echo and the speech of the near-end talker, thus making it difficult to determine the determination threshold.

In the case of a fixed threshold for noise determination, if the noise determination threshold is fixed to a high value, any signal that is smaller than the set threshold goes through the noise (residual echo) suppression means that is the LPF with a variable cut-off frequency. At this time, the lower the input near-end power, the lower the cut-off frequency of the LPF. Therefore, if the threshold setting lacks deliberation, low-power fricative consonants may be cut by bandwidth restriction.

On the other hand, if the determination threshold is fixed to a low value, the function of suppressing residual echo does not work. This is because the residual echo temporarily increases at the early learning stage of the echo canceller or at the time of echo path change. When far-end input speech increases, it is natural that echo should increase in amount. However, signal distortion may occur depending on the characteristics of a loudspeaker on the near-end side, so that the echo path characteristic becomes nonlinear, thus increasing the residual echo. The residual echo power exceeds the threshold in such a case, thus resulting in the problem that the residual echo is transmitted to the far-end side without going through the noise suppression part.

In order to cope with this problem, the determination threshold may be set to a high value so that such residual echo goes through the noise suppression part. This, however, causes another problem of the loss of the low-power signal of the near-end talker. Thus, the residual echo and the speech of the near-end talker cannot be distinguished from each other by simple power comparison, so that the noise suppression means does not function properly.

This problem is caused in a system where an echo coming out from a speaker to be input to a microphone has approximately the same magnitude as that of the speech of the near-end talker. For instance, this problem is caused in a handy phone system that requires a loudspeaker and a microphone to be arranged relatively close to each other or in an on-vehicle hands-free telephone system that outputs sound at high volume from a loudspeaker and requires a microphone to be arranged at a distance from the mouth of a speaker.

With respect to the noise suppression means using the LPF with a variable cut-off frequency, Japanese Laid-Open Patent Application No. 9-275367 discloses another technology.

Japanese Laid-Open Patent Application No. 9-275367 discloses an echo canceller device has the functions of (a) detecting the direction of communication depending on the condition of communication from an input signal from the far end (the speech of a far-end talker) and an input signal from the near end (the combination of the speech of a near-end talker and the echo sound of the speech of the far-end talker) and (b) gradually changing the cut-off frequency of an LPF for residual echo suppression every time the direction of communication changes.

Actually, however, it is difficult to detect the direction of communication under a noisy environment or in the case where the direction of communication changes frequently, so that the residual echo is transmitted to the far end if the cut-off frequency is delayed in changing with respect to a change in the direction of communication.

DISCLOSURE OF THE INVENTION

Accordingly, it is a general object of the present invention to provide an echo canceller in which the above-described disadvantages are eliminated.

A more specific object of the present invention is to provide an echo canceller that includes a noise determination function that is adaptive to the speech of a far-end talker so as to ensure further reduction in residual echo even if the residual echo increases at the early learning stage of the echo canceller or at the time of echo path change.

The above objects of the present invention are achieved by an echo canceller including: an echo cancellation part canceling echo included in a near-end input signal to the echo canceller, the near-end input signal including an echo component of a far-end input signal to the echo canceller; a noise suppression part employing a low-pass filter having a variable cut-off frequency adaptive to power of an input signal, the noise suppression part removing a residual echo component from an output of the echo canceller part; a threshold generation part generating a variable threshold varying in accordance with a power level of the far-end input signal; a determination part making a determination based on a comparison between a power level of the output of the echo cancellation part and the variable threshold; and a processing part performing noise suppression using the low-pass filter on the output of the echo cancellation part when the determination part determines that the power level of the output of the echo cancellation part is lower than or equal to the variable threshold.

The above objects of the present invention are also achieved by an echo canceller including: an echo cancellation part canceling echo included in a near-end input signal to the echo canceller, the near-end input signal including an echo component of a far-end input signal to the echo canceller; a noise suppression part employing a low-pass filter having a variable cut-off frequency adaptive to power of an input signal, the noise suppression part removing a residual echo component from an output of the echo canceller part; a first calculation part calculating a power level of the output of the echo canceller part; a second calculation part calculating a power level of the far-end input signal; a determination part making a determination based on a comparison between the power level of the output of the echo cancellation part and a variable threshold varying in accordance with the power level of the far-end input signal; and a processing part performing noise suppression using the low-pass filter on the output of the echo cancellation part when the determination part determines that the power level of the output of the echo cancellation part is lower than or equal to the variable threshold.

According to the present invention, it is considered that little or no echo exists when there is no input of far-end speech or the power of input far-end speech is low. Therefore, the threshold for noise determination can be set to a low value. In the case of the conventional fixed threshold for noise determination, any signal smaller than a set threshold for noise determination is supplied to a noise (residual echo) suppression part that is a low-pass filter (LPF) with a variable cut-off frequency, so that the cut-off frequency of the LPF becomes lower as the power of a near-end input is decreased. Therefore, if the threshold setting lacks deliberation, low-power fricative consonants may be cut by bandwidth restriction. According to the above-described echo cancellers of the present invention, however, the threshold for noise determination can be varied in accordance with the power of the far-end speech, so that the above-described disadvantage can be eliminated.

On the other hand, it is rarely the case that a high-power signal is input continuously from the far-end in a normal conversation. However, when the far-end input speech increases in power, it is natural that echo should increase. Further, signal distortion may occur depending on the characteristics of a loudspeaker on the near-end side, so that the echo path characteristic becomes nonlinear, thus increasing residual echo. Moreover, normally, the learning function of the echo canceller is suspended at the time of double talk. Accordingly, immediately after a double talk interval, not to mention at the early learning stage of the echo canceller, the echo path characteristics may change greatly so as to increase the residual echo. In such a case, the threshold for noise determination is increased in accordance with the far-end power so as to prevent the residual echo from exceeding the threshold. Thereby, the LPF is allowed to perform bandwidth cutting.

BRIEF DESCRIPTION OF THE DRAWINGS

Other objects, features and advantages of the present invention will become more apparent from the following detailed description when read in conjunction with the accompanying drawings, in which.

BEST MODE FOR CARRYING OUT THE INVENTION

A description will now be given, with reference to the accompanying drawings, of an embodiment of the present invention.

Figure 1:
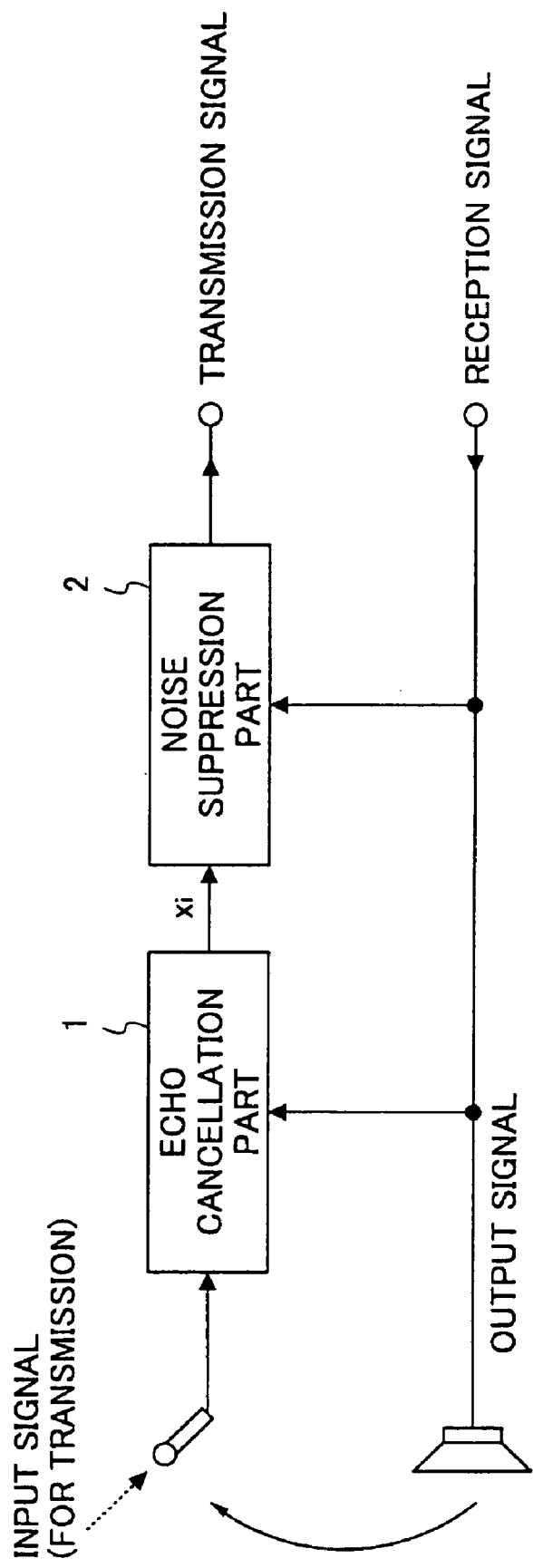
FIG. 1 is a diagram showing the configuration of an echo canceller according to an embodiment of the present invention.

FIG. 1 is a diagram showing the configuration of an echo canceller according to the embodiment of the present invention. The echo canceller of FIG. 1 includes an echo cancellation part 1 and a noise suppression part 2. According to this configuration, a signal $x_i$ output from the echo cancellation part 1 is input to the noise suppression part 2.

The echo cancellation part 1 has the same function as the conventional echo canceller. That is, the echo cancellation part 1 has the function of canceling echo by first generating a pseudo echo by supplying a reception signal to a filter simulating an echo path and then applying a phase-inverted pseudo echo to an input signal. The echo cancellation part 1 further includes the double-talk function and the howling detection function in order to realize the hands-free communication function.

The noise suppression part 2 is formed of a low-pass filter that sets a low cut-off frequency when the power of an input signal is low and sets a high cut-off frequency when the power of the input signal is high. According to the echo canceller of FIG. 1, the output of the echo cancellation part 1 is supplied to the noise suppression part 2 and thereafter, is transmitted as a transmission signal.

Figure 2:
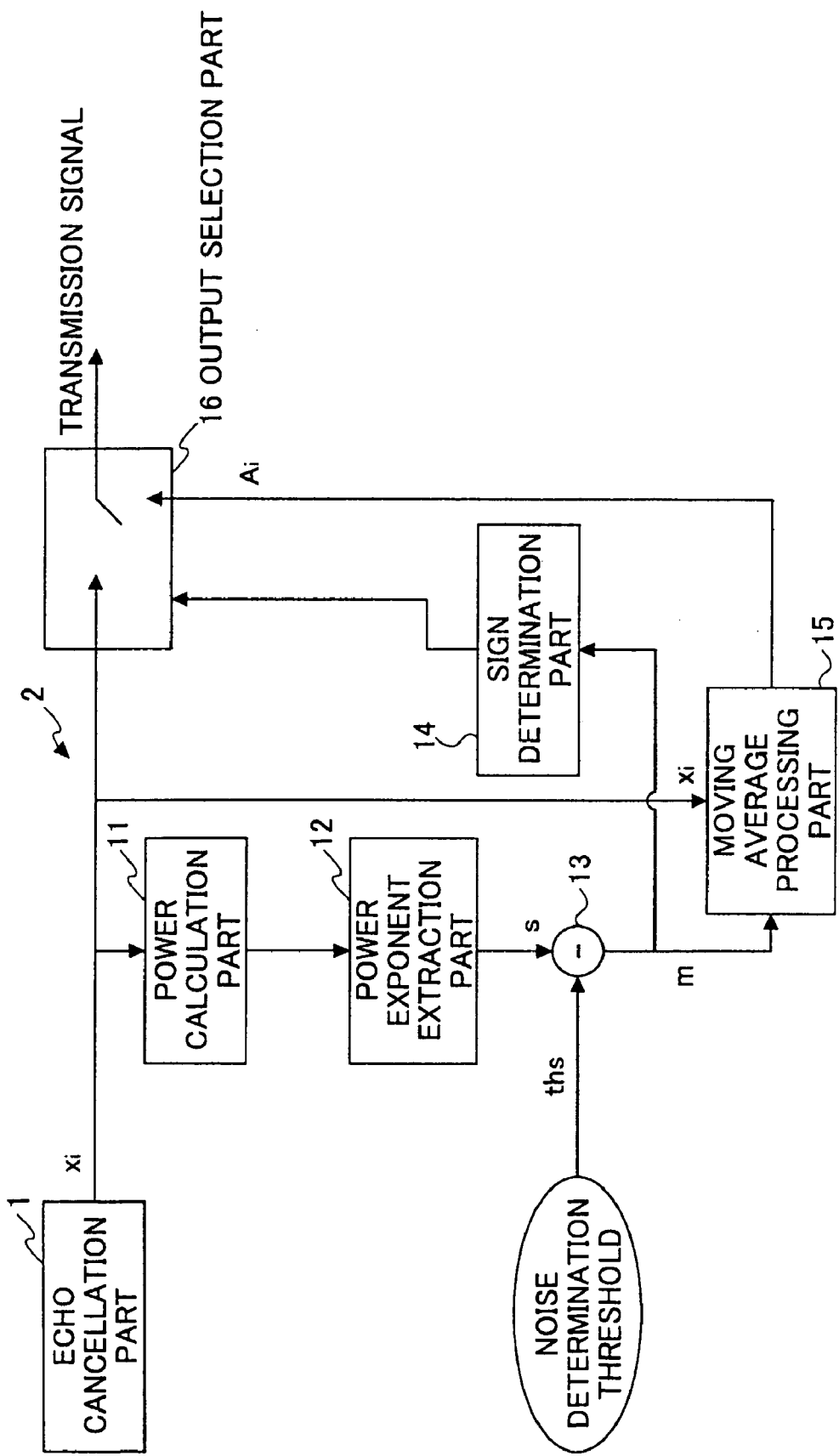
FIG. 2 is a diagram showing the configuration of a common noise suppression part.

FIG. 2 is a diagram showing a common configuration of the noise suppression part 2. According to the configuration of the noise suppression part 2 of FIG. 2, first, a power calculation part 11 and a power exponent extraction part 12 calculate the power level of the output signal $x_i$ of the echo cancellation part 1. After the power level of the signal $x_i$ is thus calculated, it is determined, by comparing the power level of the signal $x_i$ with a threshold ths for noise determination, whether the signal $x_i$ is a high-power signal such as the speech of a near-end talker or a low-power signal such as residual echo or background noise.

According to the configuration of FIG. 2, the noise suppression part 2 includes the power calculation part 11, the power exponent extraction part 12, a subtraction part 13, a sign determination part 14, and a noise suppression processing part 15. The power calculation part 11 calculates the power of the output signal $x_i$ of the echo cancellation part 1, that is, the power calculation part 11 converts the output signal $x_i$ into power. The power exponent extraction part 12 expresses the power calculated by the power calculation part 11 in the form of $2^k$, and extracts the value s of its exponent. The subtraction part 13 obtains the number of moving average interval length bits m by subtracting the exponent value s of the power in the form of $2^k$ from the noise determination threshold ths, and determines the moving average interval length to be $2^m$. The sign determination part determines whether the number of moving average interval length bits m is negative or not. The noise suppression processing part 15 performs noise suppression on the signal $x_i$.

The noise suppression part 2 further includes an output selection part 16. When the number of moving average interval length bits m is negative, the output selection part 16 determines that the level of the output signal $x_i$ of the echo cancellation part 1 (that is, the signal input to the noise suppression part 2) is higher than the noise threshold ths and that the signal $x_i$ is the speech signal of the near-end talker to be transmitted. Therefore, the output selection part 16 outputs the as-input signal $x_i$ as the transmission signal without the signal $x_i$ being subjected to the noise suppression. On the other hand, when the number of moving average interval length bits m is not negative, the output selection part 16 outputs the signal $x_i$ that has been subjected to the noise suppression in the noise suppression processing part 15 as the transmission signal.

According to the configuration of FIG. 2, the function of a low-pass filter (LPF) in the noise suppression processing part 15 is realized by moving average processing, and variations in the cut-off frequency of the LPF are realized by variations in the moving average interval length of the moving average processing. Thereby, the LPF with a variable cut-off frequency of a simple configuration is realized. That is, letting $x_i$, n, and $X_i$ be the $i^{th}$ sample of the input signal, the moving average interval length, and an approximate total value for the moving average interval, an approximate moving average value $A_i$ is obtained by the following equations:

$$m = ths - s$$

$$n = 2^m$$

$$A_i = X_i/n$$

$$X_i = (n-1)/n \times X_{i-1} + x_i$$

This shows that an interval for the moving average processing becomes longer as the power of the signal becomes lower, or m of the signal becomes greater. Consequently, the LPF equivalent to a low-pass filter with a low cut-off frequency can be realized.

Figure 3:
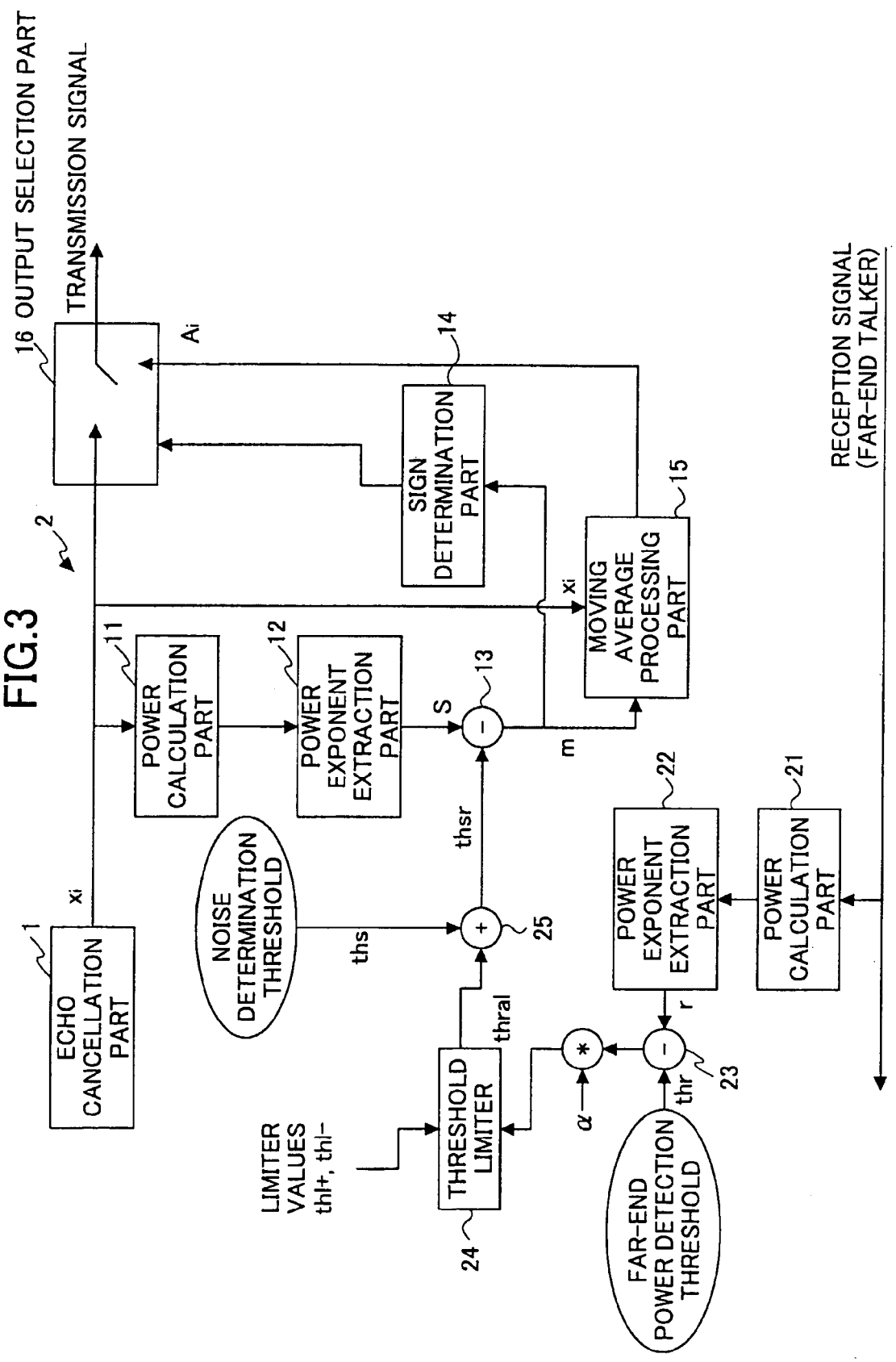
FIG. 3 is a diagram showing the configuration of a noise suppression part according to the embodiment of the present invention.

FIG. 3 is a diagram showing the configuration of the noise suppression part 2 according to the embodiment of the present invention. In the configuration of FIG. 2, the noise determination threshold ths is prestored in the form of $2^k$ in a memory, for instance. If the noise determination threshold ths is fixed, however, the above-described problem occurs in an actual usage environment. Therefore, according to the present invention, a variable noise determination threshold is set using the input power of a far-end talker.

That is, the noise suppression part 2 according to the present invention further includes a power calculation part 21, a power exponent extraction part 22, a subtraction part 23, a threshold limiter 24, and a addition part 25 for a far-end input signal in addition to the configuration of FIG. 2.

The power of the far-end input signal is expressed in the form of $2^k$, and the power exponent extraction part 22 extracts its exponent value r and sets r as the power level of the far-end input signal. The subtraction part 23 subtracts a predetermined threshold thr for far-end speech power detection from the power exponent value r and obtains a subtraction result mr.

Next, the subtraction result mr is multiplied by a parameter α for reflecting the far-end power to be output as a value thra. The value thra goes through the limiter 24 so as to have its setting range limited so that the value thra may not be set to be higher or lower than required by the effect of the far-end power. Thereby, the output value thra1 of the limiter 24 is obtained.

Figure 4:
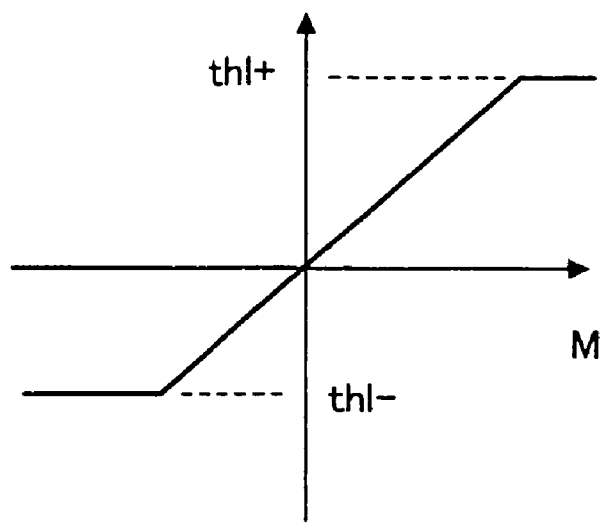
FIG. 4 is a graph for illustrating a limiting operation method.
Figure 5:
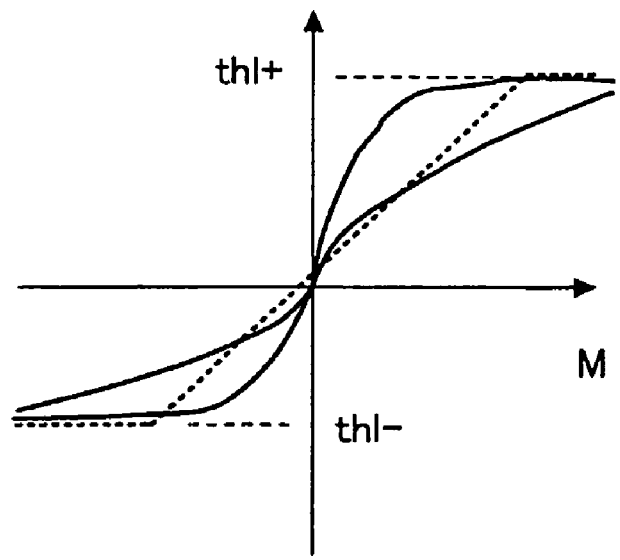
FIG. 5 is a graph for illustrating another limiting operation method.

This limiting operation may be performed by clipping as shown in FIG. 4 or by using the following equations as shown in FIG. 5:

$$mr = r - thr$$

$$M = mr \times \alpha$$

$$thra1 = th1 - \frac{\beta}{(M + \beta/th1)}$$

$$th1 = th1 + (M \geq 0)$$

$$th1 = th1 - (M < 0)$$

where thl+ is a positive limiter representing the upper limit, thl− is a negative limiter representing the lower limit, and β is a coefficient that determines a curve. As β becomes larger, the curve becomes smoother.

Next, the addition part 25 adds the output value thral of the limiter 24 to the fixed noise determination threshold ths, thereby obtaining a variable noise determination threshold thsr that is adaptive to the far-end power as shown in the following equation:

$$thsr = ths + thral$$

Thereafter, the noise suppression part 2 of FIG. 3 performs the same operation as in the configuration of FIG. 2.

The noise suppression part 2 of the present invention compares the power of the far-end signal and the output power of the echo cancellation part 1, using the calculated variable noise determination threshold thsr. As a result, if the power level of the far-end signal is so high that residual echo is increased, the noise determination threshold thsr is increased so that the residual echo may be cut by the LPF. Meanwhile, if the power of the far-end signal is so low that the residual echo is reduced, the determination threshold thsr is decreased so as to prevent the LPF from working on the near-end signal. By limiting the range of the threshold thsr through the threshold limiter 24, the LPF is prevented from cutting off the near-end signal more than necessary at the time of double talk.

Thus, according to the present invention, the noise determination threshold is varied using the input power of the far-end talker. Therefore, the residual echo component can be cut with more accuracy, so that its effect on a signal to be transmitted, such as the speech of the near-end talker, can be minimized. Thereby, a transmission signal that is so excellent as to be easy to hear can be obtained.

Further, this function can be realized with a simple configuration, so that the amount of calculation can be reduced in realizing this function in a DSP.

The present invention is not limited to the specifically disclosed embodiment, but the variations and modifications may be made without departing the scope of the present invention.

The present application is based on Japanese priority application No. 2001-355299 filed on Nov. 20, 2001, the entire contents of which are hereby incorporated by reference.

The invention claimed is:

1. An echo canceller comprising:
    an echo cancellation part canceling echo included in a near-end input signal to the echo canceller, the near-end input signal including an echo component of a far-end input signal to the echo canceller;
    a noise suppression part employing a low-pass filter having a variable cut-off frequency adaptive to power of an input signal, the noise suppression part removing a residual echo component from an output of said echo cancellation part;
    a threshold generation part generating a variable threshold varying in accordance with a power level of the far-end input signal;
    a determination part making a determination based on a comparison between a power level of the output of said echo cancellation part and the variable threshold; and
    a processing part performing noise suppression using the low-pass filter on the output of said echo cancellation part when said determination part determines that the power level of the output of said echo cancellation part is lower than or equal to the variable threshold.

2. The echo canceller as claimed in claim 1, wherein said echo cancellation part cancels the echo included in the near-end input signal by generating a pseudo echo and applying a phase-inverted pseudo echo to the near-end input signal, the echo cancellation part generating the pseudo echo by supplying the far-end input signal to a filter simulating an echo path.

3. The echo canceller as claimed in claim 1, wherein the cut-off frequency of the low-pass filter of said noise suppression part is decreased when the power of the input signal is low and is increased when the power of the input signal is high.

4. The echo canceller as claimed in claim 1, further comprising a threshold limiter setting an upper limit and a lower limit to an effect of power of the far-end input signal so is to set an upper limit and a lower limit to the variable threshold.

5. The echo canceller as claimed in claim 1, further comprising:
    a first calculation part calculating the power level of the output of said echo cancellation part; and
    a second calculation part calculating the power level of the far-end input signal.

6. The echo canceller as claimed in claim 5, further comprising a threshold limiter setting an upper limit and a lower limit to an effect of power of the far-end input signal so as to set an upper limit and a lower limit to the variable threshold.

7. The echo canceller as claimed in claim 6, wherein said threshold generation part generates the variable threshold based on an output of said threshold limiter.

8. The echo canceller as claimed in claim 6, wherein said threshold generation part generates the variable threshold based on a difference between the power level of the far-end input signal and a predetermined threshold.

9. The echo canceller as claimed in claim 6, wherein said noise suppression part comprises said threshold generation part, said determination part, said processing part, said first calculation part, said second calculation part, and said threshold limiter.

10. An echo canceller comprising:
    an echo cancellation part canceling echo included in a near-end input signal to the echo canceller, the near-end input signal including an echo component of a far-end input signal to the echo canceller;
    a noise suppression part employing a low-pass filter having a variable cut-off frequency adaptive to power of an input signal, the noise suppression part removing a residual echo component from an output of said echo cancellation part;

a first calculation part calculating a power level of the output of said echo cancellation part;

a second calculation pan calculating a power level of the far-end input signal;

a determination part making a determination based on a comparison between the power level of the output of said echo cancellation part and a variable threshold varying in accordance with the power level or the far-end input signal; and a processing part performing noise suppression using the low-pass filter on the output of said echo cancellation part when said determination part determines that the power level of the output of said echo cancellation part is lower than or equal to the variable threshold.

11. The echo canceller of claim 10, wherein the cut-off frequency of the low-pass filter of said noise suppression part is decreased when the power of the input signal is low and is increased when the power of the input signal is high.

12. The echo canceller of claim 10, further comprising a threshold limiter which sets an upper limit and a lower limit to the variable threshold.

13. The echo canceller as claimed in claim 1, wherein said threshold generation part includes a power calculation part and said power calculation part determines a power level of the far-end input signal.

* * * * *